US012681453B2

(12) United States Patent
Tani et al.

(10) Patent No.: US 12,681,453 B2
(45) Date of Patent: Jul. 14, 2026

(54) NUMERICAL CONTROLLER AND NUMERICAL CONTROL PROGRAM

(71) Applicant: FANUC CORPORATION, Yamanashi (JP)

(72) Inventors: Shouki Tani, Yamanashi (JP); Naoya Koide, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 304 days.

(21) Appl. No.: 18/261,209

(22) PCT Filed: Mar. 18, 2022

(86) PCT No.: PCT/JP2022/012571
§ 371 (c)(1),
(2) Date: Jul. 12, 2023

(87) PCT Pub. No.: WO2022/202656
PCT Pub. Date: Sep. 29, 2022

(65) Prior Publication Data
US 2024/0077845 A1      Mar. 7, 2024

(30) Foreign Application Priority Data

Mar. 24, 2021    (JP) ................................. 2021-049701

(51) Int. Cl.
*G05B 19/402*        (2006.01)
*B23Q 15/22*          (2006.01)
(Continued)

(52) U.S. Cl.
CPC ............ *G05B 19/402* (2013.01); *B23Q 15/22* (2013.01); *B23Q 17/22* (2013.01); (Continued)

(58) Field of Classification Search
CPC ............ G05B 19/4093; G05B 19/4091; G05B 19/405; G06F 9/455; G06F 17/50; B23Q 15/22; B23Q 17/22
(Continued)

(56) References Cited

U.S. PATENT DOCUMENTS 5,218,281 A * 6/1993 Sasaki .................. G05B 19/416
318/603
5,933,005 A * 8/1999 Pugh .................... G01D 5/2457
341/15
(Continued)

FOREIGN PATENT DOCUMENTS

| CN | 104731017 A | 6/2015 |
| CN | 106325222 A | 1/2017 |

(Continued)

OTHER PUBLICATIONS

International Search Report issued in PCT/JP2022/012571; mailed May 31, 2022.

*Primary Examiner* — Ronald D Hartman, Jr.

(74) *Attorney, Agent, or Firm* — Studebaker Brackett PLLC

(57) ABSTRACT

A numerical controller 10 according to an aspect of the present disclosure does not require excessive speed and acceleration yet suppress errors in movement paths, and in accordance with a machining program containing a plurality of command blocks that each specify a designated speed of a target, controls a machining device having a plurality of driving axes for driving the target. The numerical controller 10 comprises: a synthetic speed calculation unit 16 that, for at least a curve block which designates curve movement and which is from among the plurality of command blocks, calculates a synthetic speed that is revised so that the designated speed is initially accelerated from zero by a prior revision time constant and finally decelerated to zero by the (Continued)

prior revision time constant; and a prior revision speed calculation unit 17 that calculates a prior revision speed of each driving axis for each time to realize the synthetic speed.

4 Claims, 4 Drawing Sheets

(51) Int. Cl.
  *B23Q 17/22*        (2006.01)
  *G05B 19/4093*      (2006.01)
  *G06F 9/455*        (2018.01)
(52) U.S. Cl.
  CPC .................... *G05B 19/4093* (2013.01); *G05B 2219/33099* (2013.01); *G06F 9/455* (2013.01)
(58) Field of Classification Search
  USPC ......................................................... 700/186
  See application file for complete search history.

(56)                References Cited

U.S. PATENT DOCUMENTS 6,219,623  B1 *   4/2001  Wills ...................... H02J 3/381
                                                                361/60

| | | | | |
|---|---|---|---|---|
| 7,907,083 | B2 * | 3/2011 | Sakamoto ............. | G01S 13/345 |
| | | | | 342/147 |
| 8,200,468 | B2 * | 6/2012 | Ye ........................... | G06F 30/20 |
| | | | | 716/54 |
| 10,146,213 | B2 * | 12/2018 | Yoshida ............. | G05B 19/4163 |
| 11,962,139 | B2 * | 4/2024 | Robinson .................. | F16L 3/22 |
| 2002/0045957 | A1 * | 4/2002 | Otsuki ................. | G05B 19/416 |
| | | | | 700/63 |
| 2010/0049733 | A1 * | 2/2010 | Hill ...................... | G06F 16/2428 |
| | | | | 707/E17.141 |
| 2017/0276651 | A1 * | 9/2017 | Hall ........................ | G01N 29/11 |
| 2019/0129382 | A1 * | 5/2019 | Saitou ................ | G05B 19/4103 |
| 2020/0184276 | A1 * | 6/2020 | Brown .................. | G06F 16/358 |
| 2022/0177151 | A1 * | 6/2022 | Martin ..................... | G05B 9/03 |
| 2024/0077119 | A1 * | 3/2024 | Nakamura .............. | F16D 49/00 |

FOREIGN PATENT DOCUMENTS

| CN | 106662860 | A | 5/2017 |
|---|---|---|---|
| CN | 108375957 | A | 8/2018 |
| JP | H01-099103 | A | 4/1989 |
| JP | H03-292508 | A | 12/1991 |
| JP | H06-110534 | A | 4/1994 |
| JP | H06-187026 | A | 7/1994 |
| JP | 2020-019125 | A | 2/2020 |

* cited by examiner

FIG. 2

NUMERICAL CONTROLLER AND NUMERICAL CONTROL PROGRAM

TECHNICAL FIELD

The present invention relates to a numerical controller and a numerical control program.

BACKGROUND ART

A numerical controller controls a machining device according to a machining program in which a movement path for a target such as a workpiece, a tool, or the like is expressed by a plurality of designated coordinates that the target should pass, a movement speed, and the like. The numerical controller analyzes the machining program, performs an interpolation process calculating, for each driving axis of the machining device, a desired speed and position for each time, and drives the driving axes on the basis of the interpolated information.

Machining programs are created without consideration to the characteristics of the machining device. Therefore, when attempting to execute the operations as described by the machining program, a significant speed or acceleration may be required, and there is a risk of exceeding the capacity of the driving axis, or that a vibration may occur. For this reason, numerical controllers may perform an acceleration/deceleration process for each block of the machining program designating operations between two designated coordinates that are continuous with each other, revising the movement speed of each block such that the speed is initially accelerated from zero, and the speed is finally decelerated to zero. Normally, in the acceleration/deceleration process, the speed is set to zero at the starting point of a block and accelerated by a certain acceleration, and the speed is reduced by a certain acceleration before the ending point of the block such that the speed becomes zero at the ending point. In this case, immediately after the start of each block, the driving axes are driven at a speed that is obtained by adding speed data for increasing the speed from zero to the speed of the block and speed data for decelerating and stopping at the ending point of the immediately preceding block.

However, when performing such an acceleration/deceleration process, the movement path of the target will deviate from the path designated by the machining program. In particular, when moving a target so as to describe an arc, it is known that performing an acceleration/deceleration process causes the target to pass inwardly of the path designated by the machining program. It has thus been proposed to reduce the error in the movement path by gradually reducing the time constant (acceleration) of the acceleration/deceleration upon the start of the block that designates an arcuate movement path (for example, see Patent Document 1).

Patent Document 1: Japanese Unexamined Patent Application, Publication No. H3-292508

DISCLOSURE OF THE INVENTION

Problems to be Solved by the Invention

When the time constant of the acceleration/deceleration upon the start of the block is reduced, there is a possibility that, when adding the speed data for increasing the speed immediately after the start of the block and the speed data for decelerating and stopping at the ending point of the immediately preceding block, an excessive speed and acceleration that exceeds the capacity of the driving axis or causes a vibration is required. Therefore, there is a demand for a technique that does not require an excessive speed and acceleration, yet reduces errors in movement paths. Means for Solving the Problems A numerical controller according to an aspect of the present disclosure is a numerical controller that controls, in accordance with a machining program containing a plurality of command blocks that each specify a designated speed of a target, a machining device having a plurality of driving axes for driving the target, the numerical controller including: a synthetic speed calculation unit configured to, for at least a curve block that designates a curve movement among the plurality of command blocks, calculate a synthetic speed that is revised so that the designated speed is initially accelerated from zero by a prior revision time constant and finally decelerated to zero by the prior revision time constant; and a prior revision speed calculation unit configured to calculate a prior revision speed of each driving axis for each time to realize the synthetic speed.

A numerical control program according to an aspect of the present disclosure is a numerical control program for controlling, in accordance with a machining program containing a plurality of command blocks that each specify a designated speed of a target, a machining device having a plurality of driving axes for driving the target, the numerical control program including: a synthetic speed calculation control unit configured to, for at least a curve block that designates a curve movement among the plurality of command blocks, calculate a synthetic speed that is revised so that the designated speed is initially accelerated from zero by a prior revision time constant and finally decelerated to zero by the prior revision time constant; and a prior revision speed calculation control unit configured to calculate a prior revision speed of each driving axis for each time to realize the synthetic speed. Effects of the Invention According to the present invention, it is possible to provide a numerical controller and a numerical control program that do not require an excessive speed and acceleration, yet reduce errors in movement paths.

BRIEF DESCRIPTION OF THE DRAWINGS

FIG. 2 illustrates an example of a movement path specified by a machining program;

PREFERRED MODE FOR CARRYING OUT THE INVENTION

Figure 1:
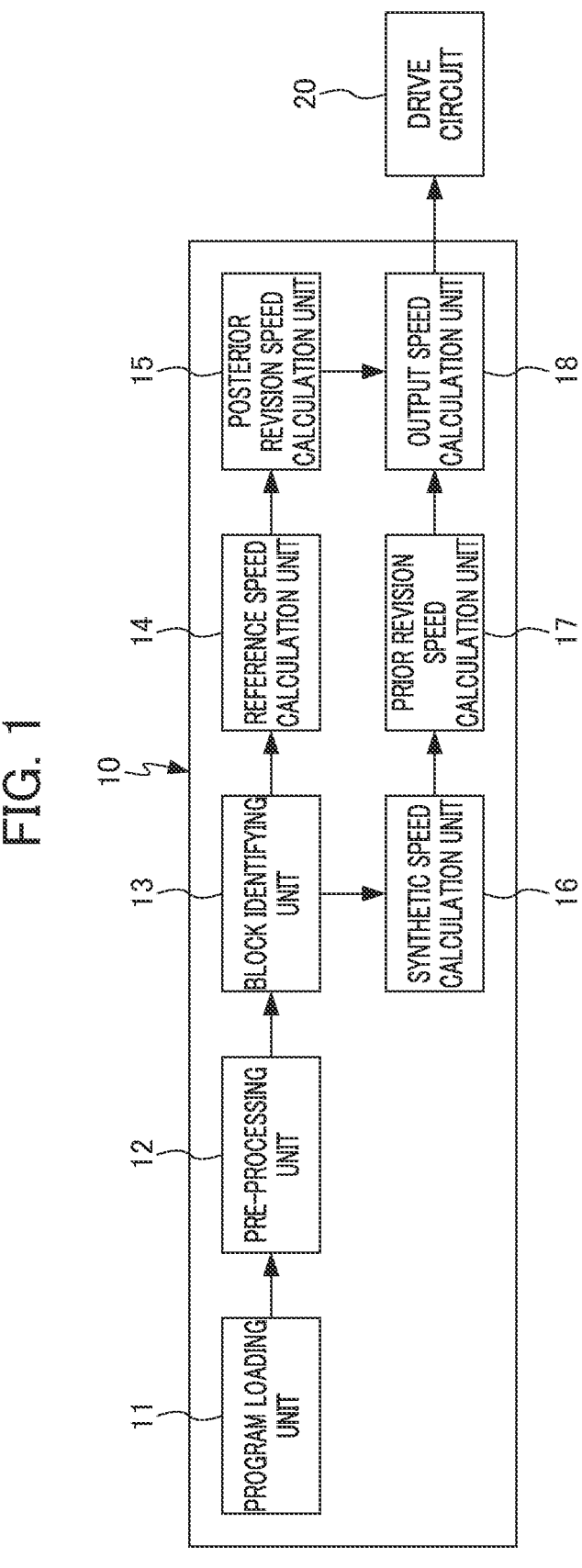
FIG. 1 is a block diagram illustrating a configuration of a numerical controller according to an embodiment of the present disclosure.

An embodiment of the present invention is described below with reference to the drawings. FIG. 1 is a block diagram illustrating a configuration of a numerical controller 10 according to an embodiment of the present disclosure.

The numerical controller 10 controls a machining device having a plurality of driving axes that drive a target (for example, a tool, a workpiece, or the like), according to a machining program including a plurality of command blocks that each specify a designated speed for the target. In other words, the numerical controller 10 inputs command values into a drive circuit (support drive) 20 that drives the plurality of driving axes of the machining device. In the machining program, the command blocks generally specify a movement path of the target, by specifying coordinates of a starting point and an ending point of the movement path, and a movement speed.

The numerical controller 10 may be realized by causing a calculator device having, for example, a CPU, a memory, an input interface, and the like, to execute a numerical control program according to the present disclosure. The numerical controller 10 has a program loading unit 11, a pre-processing unit 12, a block identifying unit 13, a reference speed calculation unit 14, a posterior revision speed calculation unit 15, a synthetic speed calculation unit 16, a prior revision speed calculation unit 17, and an output speed calculation unit 18. These elements are classifications of the functions of the numerical controller 10, and need not be clearly distinguishable in terms of physical structure and program structure.

The program loading unit 11 loads a machining program stored in a storage medium into a working memory, command block by command block. The program loading unit 11 may in advance load command blocks to be executed later, within a permissible scope of the capacity of the storage region.

When a stepwise speed change is designated at the beginning and the end of command blocks to be continuously processed in the machining program, the pre-processing unit 12 revises the contents of the command blocks such that the speed change occurs at an acceleration that is within a permissible scope.

The block identifying unit 13 identifies whether each of the command blocks is a linear block designating a linear movement of the target, or a curve block designating a curve movement of the target.

The reference speed calculation unit 14 calculates, for a linear block, a reference speed that is an ideal value for a speed of the driving axes for each time for realizing the designated speed. In other words, the reference speed calculation unit 14 calculates an ideal value (a speed for reproducing a movement that is faithful to the command block) for the speed of the driving axes for each time between the starting point and the ending point of the movement path of the target identified by the command block. The reference speed calculation unit 14 thus performs a calculation to interpolate a speed command value between the starting point and the ending point of the command block.

The posterior revision speed calculation unit 15 calculates a posterior revision speed that is revised such that the reference speed calculated by the reference speed calculation unit 14 is initially accelerated from zero by a posterior revision time constant and finally decelerated to zero by the posterior revision time constant. Accordingly, the posterior revision speed has, in order, an acceleration segment in which the speed gradually increases, a constant speed segment in which the speed is constant, and a deceleration segment in which the speed gradually decreases. The posterior revision time constant is set in advance according to the properties, etc. of the machining device.

The posterior revision speed calculation unit 15 preferably sets the posterior revision speed to be accelerated from the starting point time of the reference speed, and decelerated from the ending point time of the reference speed. That is to say, the posterior revision speed calculation unit 15 preferably determines an initial time change of the posterior revision speed in the command block by setting the speed of the driving axis at the starting point time of the reference speed to zero, and revising the time change of the reference speed such that acceleration of the driving axis is initiated from the starting point time of the reference speed. In addition, the posterior revision speed calculation unit 15 preferably determines a final time change of the posterior revision speed in the command block by setting the speed of the driving axis at the starting point time of the reference speed to the reference speed calculated by the reference speed calculation unit 14, and revising the time change of the reference speed such that deceleration of the driving axis is initiated after the starting point time of the reference speed (adding a speed change after the ending point time). As an example of such a posterior revision speed, a posterior revision speed at a certain time may be calculated as the average value of the reference speed from a time prior to the certain time by the posterior revision time constant to the certain time.

The synthetic speed calculation unit 16 calculates, for a curve block, a synthetic speed that is revised so that the designated speed is initially accelerated from zero by a prior revision constant and finally decelerated to zero by the prior revision constant. In other words, before the calculation of the speed of the driving axis for each time, the synthetic speed calculation unit 16 revises the movement speed of the target that constitutes the basis of computation of the speed of the driving axis for each time. The synthetic speed calculation unit 16 performs acceleration and deceleration on a movement path designated by the curve block. In other words, the synthetic speed calculation unit 16 calculates the acceleration and deceleration of the designated speed as a change in an angular speed.

The synthetic speed calculation unit 16 may set the prior revision time constant in the acceleration segment and the prior revision time constant in the deceleration segment to different values. However, when the immediately previous command block is a linear block, the synthetic speed calculation unit 16 preferably sets the prior revision time constant to be equal to the posterior revision time constant applied to the immediately previous command block. Thus, the initial deceleration of the movement speed in the curve block by the synthetic speed calculation unit 16 is offset by the deceleration portion added to the end of the speed change in the immediately previous linear block by the posterior revision speed calculation unit 15. Therefore, no distorted speed change occurs in the boundary between the linear block and the curve block, and thus vibrations and the like of the machining device are reduced. Alternatively, when curve blocks are continuous with each other, and the movement direction at the ending point of the anterior block and the movement direction at the starting point of the subsequent block match, the prior revision time constant of the deceleration segment of the anterior curve block and the prior revision time constant of the acceleration segment of the subsequent curve block may be zero.

The prior revision speed calculation unit 17 calculates a prior revision speed that is a time speed of the driving axes for each time to realize the synthetic speed calculated by the synthetic speed calculation unit 16. Thus, by interpolating the speed change between the starting points and the ending points, on the basis of the synthetic speed in which the speed change based on the command blocks is revised such that an excessive speed change does not occur near the starting points and near the ending points, the deviation of an actual movement path of the target from the movement path specified by the command blocks can be reduced.

The output speed calculation unit 18 calculates an output speed by adding the posterior revision speed calculated by the posterior revision speed calculation unit 15 and the prior revision speed calculated by the prior revision speed calculation unit 17. In other words, the output speed calculation unit 18 calculates the output speed designating the time change of the speed of the driving axes by connecting the posterior revision speeds or prior revision speeds of the command blocks while overlapping the ending point time of the previous command block and the starting point time of the next command block. Thus, it is possible to input, into the drive circuit 20, a command value that can move the target in a relatively precise manner along a complex movement route specified by a plurality of command blocks, without requiring excessive speed and acceleration.

As is clear from the description above, a numerical control program according to the present disclosure for realizing the numerical controller 10 includes a program loading control unit that realizes the program loading unit 11, a pre-processing control unit that realizes the pre-processing unit 12, a block identifying control unit that realizes the block identifying unit 13, a reference speed calculation control unit that realizes the reference speed calculation unit 14, a posterior revision speed calculation control unit that realizes the posterior revision speed calculation unit 15, a synthetic speed calculation control unit that realizes the synthetic speed calculation unit 16, a prior revision speed calculation control unit that realizes the prior revision speed calculation unit 17, and an output speed calculation control unit that realizes the output speed calculation unit 18. The numerical control program according to the present disclosure may be provided in a state of being stored in a storage medium that stores the program in a non-transitory manner.

The calculation of the output speed from the machining program in the numerical controller 10 will be specifically described. As an example, a case is described in which the machining program has a first linear block N1, a curve block N2, and a second linear block N3 continuously in that order, as illustrated in FIG. 2
In this example, the machining device has an X-direction driving axis that moves the target in an X direction, and a Y-direction driving axis that moves the target in a Y direction, and the machining device moves the target on an X-Y plane.

Figure 2:
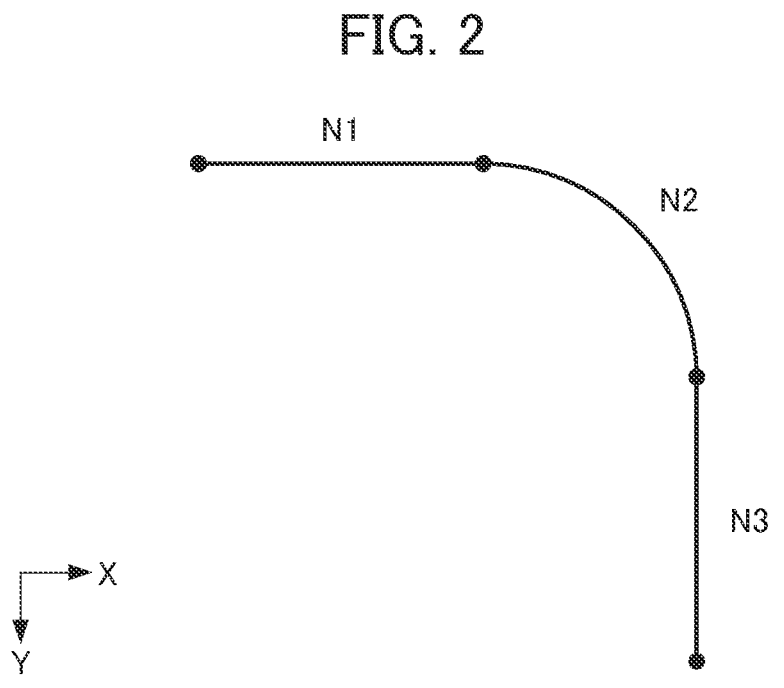
Figure 3:
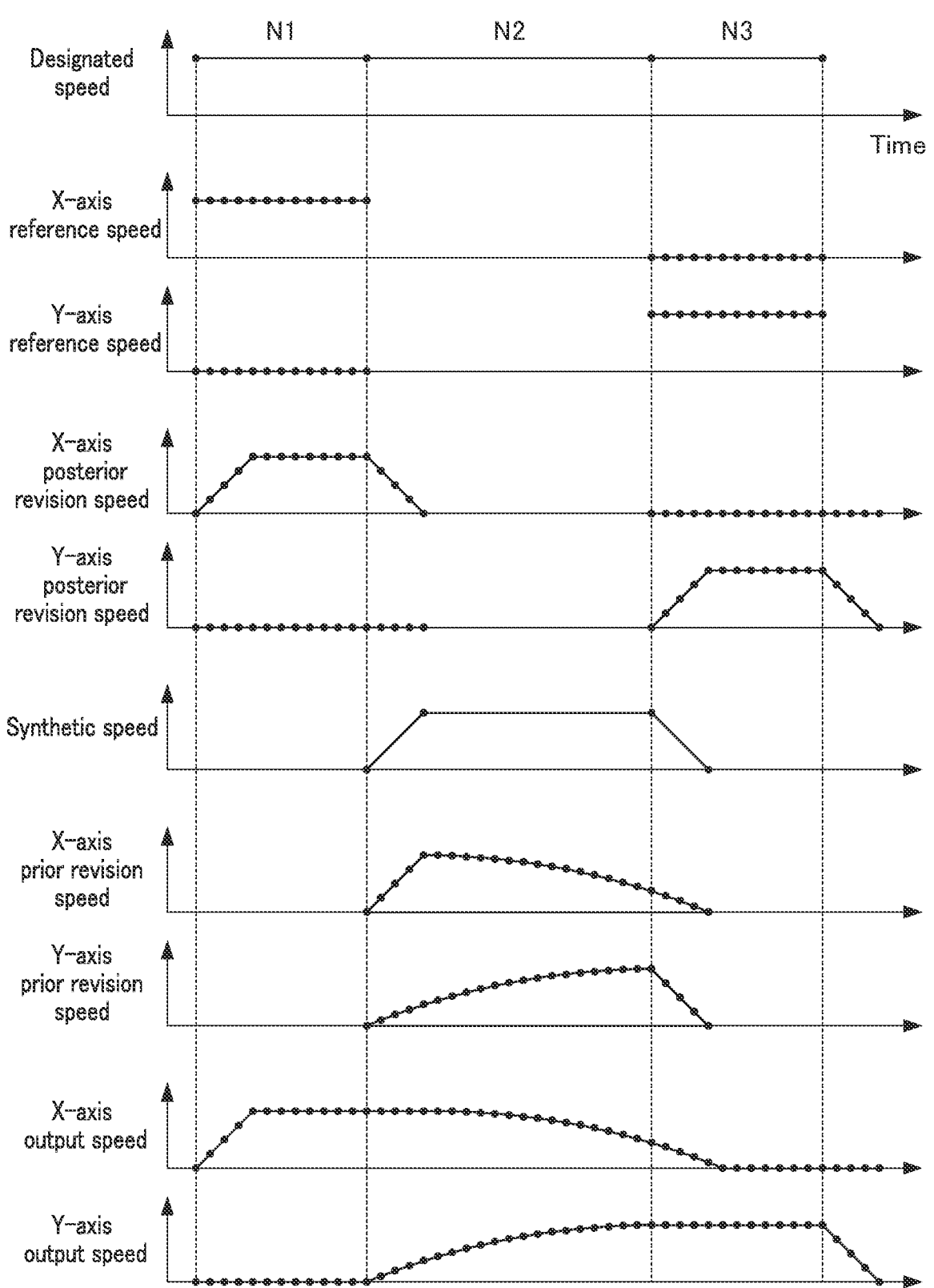
FIG. 3 illustrates various speeds calculated by the numerical controller of FIG. 1 for realizing the movement path of FIG. 2.

FIG. 3 illustrates, regarding the first linear block N1, the curve block N2, and the second linear block N3 of FIG. 2, a designated speed for each command block, and a synthetic speed, a prior revision speed, a reference speed, and a posterior revision speed for each driving axis. The markers in the drawing indicate points where speed values are specified.

In the illustrated example, the designated speed (the absolute value of the movement speed) of the first linear block N1, the curve block N2, and the second linear block N3 does not change, and only the orientation thereof changes. Specifically, the first linear block N1 designates movement at a uniform speed in the X direction, the curve block N2 designates movement at a uniform speed describing an arc having a central angle of 90 degrees, and the second linear block N3 designates movement at a uniform speed in the Y direction.

The reference speed calculation unit 14 separates the respective speeds of the first linear block N1 and the second linear block N3 into an X-direction component and a Y-direction component, and calculates (interpolates) values of the X-direction component and the Y-direction component for each tome. Thus, an X-axis reference speed is obtained which is continuous data of the speed at each time of the X-direction driving axis, and a Y-axis reference speed is obtained which is continuous data of the speed at each time of the Y-direction driving axis. The first linear block N1 is represented by an X-axis reference speed that has a constant value, and a Y-axis reference speed that has no value (the speed is constantly zero). The second linear block N3 is represented by an X-axis reference speed that has no value, and a Y-axis reference speed that has a constant value.

The posterior revision speed calculation unit 15 calculates an X-axis posterior revision speed and a Y-axis posterior revision speed by revising the X-axis reference speed and the Y-axis reference speed so as to be accelerated and decelerated by a posterior revision time constant. In the illustrated example, the X-axis posterior revision speed and the Y-axis posterior revision speed accelerate from the starting point time of the X-axis reference speed and the Y-axis reference speed, and decelerate from the ending point time of the X-axis reference speed and the Y-axis reference speed. As a result, the first linear block N1 is represented by an X-axis posterior revision speed in which the speed changes in a trapezoidal shape, and a Y-axis posterior revision speed that has no value. The second linear block N3 is represented by an X-axis posterior revision speed that has no value, and a Y-axis posterior revision speed in which the speed changes in a trapezoidal shape.

The synthetic speed calculation unit 16 revises the designated speed of the curve block N2 to calculate a synthetic speed that is initially accelerated from zero by a prior revision time constant and finally decelerated by the prior revision time constant. Thus, the curve block N2 is represented by the synthetic speed in which the absolute value undergoes a speed change in a trapezoidal shape. The prior revision time constant of the curve block N2 is set to be equal to the posterior revision time constant applied to the immediately previous first linear block N1.

The prior revision speed calculation unit 17 calculates an X-axis prior revision speed and a Y-axis prior revision speed that are speeds of the X-direction driving axis and the Y-direction driving axis for each time capable of realizing the synthetic speed. Seen from the center of the path in the curve block N2, with the angle from the starting position of the position of the target at this time represented by θ, the X-axis prior revision speed is the synthetic speed multiplied by sin θ, and the Y-axis prior revision speed is the synthetic speed multiplied by cos θ.

The output speed calculation unit 18 calculates an X-axis output speed that constitutes an operation command value for the X-direction driving axis, by adding the X-axis posterior revision speed of the first linear block N1, the X-axis prior revision speed of the curve block N2, and the X-axis posterior revision speed of the second linear block N3, and calculates a Y-axis output speed that constitutes an operation command value for the Y-direction driving axis, by adding the Y-axis posterior revision speed of the first linear block N1, the Y-axis prior revision speed of the curve block N2, and the Y-axis posterior revision speed of the second linear block N3.

The deceleration segment of the X-axis posterior revision speed of the first linear block N1 and the acceleration segment of the X-axis prior revision speed of the curve block N2 overlap each other in time, and therefore, in this time range, the sum of the X-axis posterior revision speed of the first linear block N1 and the X-axis prior revision speed of the curve block N2 becomes the X-axis output speed. Similarly, the deceleration segment of the X-axis prior revision speed of the curve block N2 and the acceleration segment of the X-axis posterior revision speed of the second linear block N3 are also added to each other. The speed increase for adding the deceleration segment and the speed decrease for forming the acceleration segment offset each other, and therefore, the X-axis output speed changes in a continuous manner without including an excessive speed or acceleration, and errors in the movement path of the target are reduced. In addition, regarding the Y-axis output speed, the deceleration segments and the acceleration segments of the Y-axis posterior revision speed and the Y-axis prior revision speed are added to each other similarly to the X-axis output speed, and changes in a continuous manner without including an excessive speed or acceleration, and errors in the movement path of the target are reduced.

Figure 4:
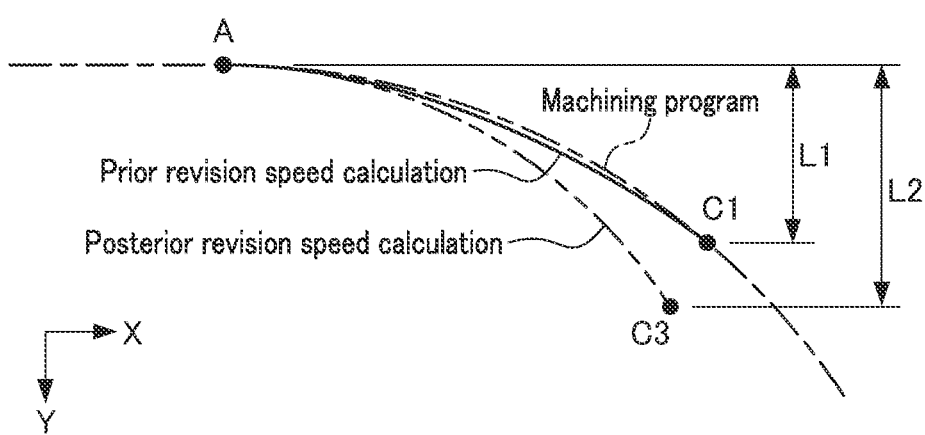
FIG. 4 illustrates the movement path of FIG. 2, a movement path when a prior revision speed is calculated for a curve block, and a movement path when a posterior revision speed is calculated for a curve block.
Figure 5:
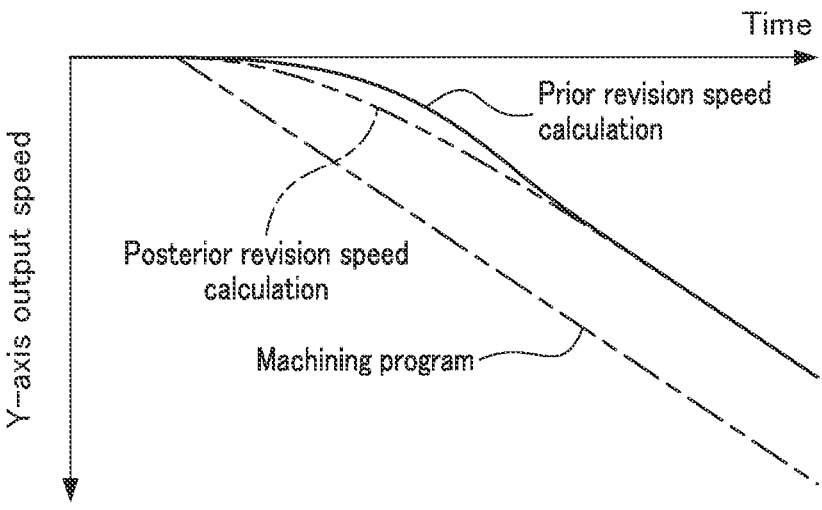
FIG. 5 is a graph illustrating a time change of the movement speed when the prior revision speed is calculated and when the posterior revision speed is calculated when following the machining program.

FIG. 4 illustrates the movement path of the target designated by the machining program of FIG. 2, a route that follows the operation command value (the operation command value when a prior revision speed is calculated by the synthetic speed calculation unit 16 and the prior revision speed calculation unit 17 for the curve block N2) of the numerical controller 10, and a route that follows an operation command value when a posterior revision speed is calculated by the reference speed calculation unit 14 and the posterior revision speed calculation unit 15 for the curve block N2 as well. In addition, FIG. 5 illustrates a time change of the movement speed of the target corresponding to FIG. 4.

In the movement route when a prior revision speed is calculated (solid line) and the movement route when a posterior revision speed is calculated (two-dot chain line), acceleration in the Y-axis direction begins at an arcuate movement starting point A in the movement route designated by the machining program (one-dot chain line), and the acceleration in the Y-axis direction ends at the respective points C1 and C2. An acceleration distance L1 when a prior revision speed is calculated is shorter than an acceleration distance L2 when a posterior revision speed is calculated. Therefore, the speed gradient when a prior revision speed is calculated is greater than the speed gradient when a posterior revision speed is calculated.

As described above, the numerical controller 10 does not require an excessive speed and acceleration yet reduces errors in movement paths, by calculating a synthetic speed that provides an acceleration segment and a deceleration segment to the designated speed of the curve block, and then calculating a prior revision speed that is the speed of each driving axis for each time.

An embodiment of the numerical controller and the numerical control program according to the present disclosure has been described above, but the numerical controller and the numerical control program according to the present disclosure is not limited to the embodiment described above. In addition, the effects described in the above embodiment are merely a list of the most preferred effects exhibited by the numerical controller and the numerical control program according to the present disclosure, and the effects of the numerical controller and the numerical control program according to the present disclosure are not limited to those described in the above embodiment.

In the numerical controller and the numerical control program according to the present disclosure, the curve block is not limited to a block that defines an arc, and may be a block that defines, for example, a two-dimensional curve such as an elliptic curve, a spiral curve, and an involute curve, or a three-dimensional curve such as a helical curve.

The numerical controller and the numerical control program according to the present disclosure may be configured to not identify curve blocks and linear blocks, and calculate the prior revision speed by processing the linear blocks using the synthetic speed calculation unit and the prior revision speed calculation unit as well.

EXPLANATION OF REFERENCE NUMERALS

10 Numerical controller
11 Program loading unit
12 Pre-processing unit
13 Block identifying unit
14 Reference speed calculation unit
15 Posterior revision speed calculation unit
16 Synthetic speed calculation unit
17 Prior revision speed calculation unit
18 Output speed calculation unit
20 Drive circuit

The invention claimed is:

1. A numerical controller for controlling, in accordance with a machining program containing a plurality of command blocks that each specify a designated speed of a target, a machining device having a plurality of driving axes for driving the target, the numerical controller comprising:

a synthetic speed calculation unit configured to, for at least a curve block that designates a curve movement among the plurality of command blocks, calculate a synthetic speed that is revised so that the designated speed is initially accelerated from zero by a prior revision time constant and finally decelerated to zero by the prior revision time constant;

a prior revision speed calculation unit configured to calculate a prior revision speed of each driving axis for each time to realize the synthetic speed;

a block identifying unit configured to identify whether each of the command blocks is the curve block or a linear block that designates a linear movement;

a reference speed calculation unit configured to calculate, for each linear block, a reference speed of each driving axis for each time to realize the designated speed;

a posterior revision speed calculation unit configured to calculate a posterior revision speed that is revised so that the reference speed is initially accelerated from zero by a posterior revision time constant and finally decelerated to zero by the posterior revision time constant; and an output speed calculation unit configured to calculate an output speed by adding the prior revision speed and the posterior revision speed.

2. The numerical controller according to claim 1, wherein the synthetic speed calculation unit sets the synthetic speed to be accelerated from a starting point time of the curve block, and decelerated from an ending point time of the curve block, and the posterior revision speed calculation unit sets the posterior revision speed to be accelerated from a starting point time of the reference speed, and decelerated from an ending point time of the reference speed.

3. The numerical controller according to claim 1, wherein the synthetic speed calculation unit, when the immediately previous command block is the linear block, sets the prior revision time constant to be equal to the posterior revision time constant that is applied to the immediately previous linear block.

4. A non-transitory storage medium which non-transitorily stores a numerical control program for controlling, in accordance with a machining program containing a plurality of command blocks that each specify a designated speed of a target, a machining device having a plurality of driving axes for driving the target, the numerical control program comprising:

a synthetic speed calculation control unit configured to, for at least a curve block that designates a curve movement among the plurality of command blocks, calculate a synthetic speed that is revised so that the designated speed is initially accelerated from zero by a prior revision time constant and finally decelerated to zero by the prior revision time constant;

a prior revision speed calculation control unit configured to calculate a prior revision speed of each driving axis for each time to realize the synthetic speed;

a block identifying control unit configured to identify whether each of the command blocks is the curve block or a linear block that designates a linear movement;

a reference speed calculation control unit configured to calculate, for each linear block, a reference speed of each driving axis for each time to realize the designated speed;

a posterior revision speed calculation control unit configured to calculate a posterior revision speed that is revised so that the reference speed is initially accelerated from zero by a posterior revision time constant and finally decelerated to zero by the posterior revision time constant; and an output speed calculation control unit configured to calculate an output speed by adding the prior revision speed and the posterior revision speed.

* * * * *